(12) United States Patent
Volkovs et al.

(10) Patent No.: US 12,106,220 B2
(45) Date of Patent: Oct. 1, 2024

(54) REGULARIZATION OF RECURRENT MACHINE-LEARNED ARCHITECTURES WITH ENCODER, DECODER, AND PRIOR DISTRIBUTION

(71) Applicant: The Toronto-Dominion Bank, Toronto (CA)

(72) Inventors: Maksims Volkovs, Toronto (CA); Mathieu Jean Remi Ravaut, Toronto (CA); Kin Kwan Leung, Toronto (CA); Hamed Sadeghi, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 472 days.

(21) Appl. No.: 16/435,213

(22) Filed: Jun. 7, 2019

(65) Prior Publication Data

US 2020/0184338 A1 Jun. 11, 2020

Related U.S. Application Data

(60) Provisional application No. 62/778,277, filed on Dec. 11, 2018.

(51) Int. Cl.
*G06N 3/084* (2023.01)
*G06N 3/044* (2023.01)
(Continued)

(52) U.S. Cl.
CPC ............ *G06N 3/084* (2013.01); *G06N 3/044* (2023.01); *G06N 3/045* (2023.01); *G06N 20/20* (2019.01)

(58) Field of Classification Search
CPC ........ G06N 3/084; G06N 3/044; G06N 3/045; G06N 20/20; G06N 3/047
See application file for complete search history.

(56) References Cited

U.S. PATENT DOCUMENTS 10,346,524 B1 * 7/2019 Zheng ................... G06N 3/0454
10,872,299 B2 * 12/2020 Wayne ................... G06N 20/00
(Continued)

FOREIGN PATENT DOCUMENTS

WO WO-2018142378 A1 * 8/2018 ............. G06N 20/00
WO WO-2018172513 A1 * 9/2018 ............. G06N 3/084

OTHER PUBLICATIONS

Bowman et. al., "Generating Sentences from a Continuous Space", May 12, 2016, arXiv, v 1511.06349v4, pp. 1-12 (Year: 2016).*
(Continued)

*Primary Examiner* — Ann J Lo
*Assistant Examiner* — Leonard A Sieger
(74) *Attorney, Agent, or Firm* — Fenwick & West LLP

(57) ABSTRACT

A modeling system trains a recurrent machine-learned model by determining a latent distribution and a prior distribution for a latent state. The parameters of the model are trained based on a divergence loss that penalizes significant deviations between the latent distribution the prior distribution. The latent distribution for a current observation is a distribution for the latent state given a value of the current observation and the latent state for the previous observation. The prior distribution for a current observation is a distribution for the latent state given the latent state for the previous observation independent of the value of the current observation, and represents a belief about the latent state before input evidence is taken into account.

21 Claims, 9 Drawing Sheets

(51) Int. Cl.
  *G06N 3/045* (2023.01)
  *G06N 20/20* (2019.01)

(56) References Cited

U.S. PATENT DOCUMENTS

| | | | |
|---|---|---|---|
| 2017/0206464 A1* | 7/2017 | Clayton | G06N 3/0445 |
| 2017/0230675 A1* | 8/2017 | Wierstra | G06N 3/0445 |
| 2019/0244680 A1* | 8/2019 | Rolfe | G16H 50/20 |
| 2019/0370637 A1* | 12/2019 | Dunning | G06F 17/18 |
| 2020/0160176 A1* | 5/2020 | Mehrasa | G06N 3/047 |
| 2021/0004677 A1* | 1/2021 | Menick | G06N 3/08 |
| 2021/0089884 A1* | 3/2021 | Macready | G06N 3/0472 |

OTHER PUBLICATIONS

Graves et. al., "Associative Compression Networks for Representation Learning", Apr. 26, 2018, arXiv, v 1804.02476v2, pp. 1-13 (Year: 2018).*
Kingma et. al. "Auto-Encoding Variational Bayes", May 1, 2014, arXiv, v 1312.6114v10, pp. 1-14 (Year: 2014).*
Fabius et al., "Variational Recurrent Auto-Encoders", Jun. 15, 2015, arXiv, v 1412.6581v6, pp. 1-5 (Year: 2015).*
Chung et al., "Recurrent Latent Variable Model for Sequential Data", Apr. 6, 2016, arXiv, v 1506.02216v6, pp. 1-9 (Year: 2016).*
Le et al., "Variational memory encoder-decoder", Dec. 8, 2018, Advances in neural information processing systems, vol. 31, pp. 1-11 (Year: 2018).*
Bayer et al., "Learning Stochastic Recurrent Networks", 2015, arXiv, v1411.7610v3, pp. 1-9 (Year: 2015).*
Serban et al., "A Hierarchical Latent Variable Encoder-Decoder Model for Generating Dialogues", 2017, Proceedings of the Thirty-First AAAI Conference on Artificial Intelligence, vol. 31(2017) pp. 3295-3301 (Year: 2017).*
Kingma et. al. "Auto-Encoding Variational Bayes", 2014, arXiv, v1312.6114v10, pp. 1-14 (Year: 2014).*
Denton et al., "Stochastic Video Generation with a Learned Prior", Jul. 2018, Proceedings of the 35th International Conference on Machine Learning, vol. 35 (2018), pp. 1-10 (Year: 2018).*
Fraccaro et al., "Sequential Neural Models with Stochastic Layers", 2016, Advances in Neural Information Processing Systems 29 (NIPS 2016), vol. 29 (2016), pp. 1-9 (Year: 2016).*
Krishnan et al., "Deep Kalman Filters", 2015, arXiv, v2, pp. 1-17 (Year: 2015).*
Goyal et al., "Z-Forcing: Training Stochastic Recurrent Networks", 2017, 31st Conference on Neural Information Processing Systems (NIPS 2017), vol. 31 (2017), pp. 1-11 (Year: 2017).*
Chung et al., "A Recurrent Latent Variable Model for Sequential Data", 2015, Advances in Neural Information Processing Systems, vol. 28(2015), pp. 1-9 (Year: 2015).*
Ba, J. L. et al., "Layer Normalization," arXiv:1607.06450, Jul. 21, 2016, pp. 1-14.
Bengio, Y. et al., "A Neural Probabilistic Language Model," Neural Information Processing Systems, Nov. 2000, pp. 1-7.
Brownlee, J. "A Gentle Introduction to LSTM Autoencoders," Nov. 5, 2018, 13 pages, [Online] [Retrieved on Sep. 23, 2019] Retrieved from the Internet <URL: https://machinelearningmastery.com/lstm-autoencoders/>.
Cho, K. et al., "Learning Phrase Representations using RNN Encoder-Decoder for Statistical Machine Translation," Proceedings of the 2014 Conference on Empirical Methods in Natural Language Processing (EMNLP), Oct. 2014, pp. 1724-1734.
Chung, J. et al., "A Recurrent Latent Variable Model for Sequential Data," Neural Information Processing Systems, Dec. 2015, pp. 1-9.
Cooijmans, T. et al., "Recurrent Batch Normalization," ICLR 2017, Feb. 28, 2017, pp. 1-13.
Devlin, J. et al., "BERT: Pre-training of Deep Bidirectional Transformers for Language Understanding," arXiv:1810.04805, Oct. 11, 2018, pp. 1-14.
Fraccaro, M. et al., "Sequential Neural Models with Stochastic Layers," Neural Information Processing Systems, Dec. 2016, pp. 1-9.
Gal, Y. et al., "A Theoretically Grounded Application of Dropout in Recurrent Neural Networks," Neural Information Processing Systems, Dec. 2016, pp. 1-9.
Hochreiter, S. et al., "Long Short-Term Memory," Neural Computation, vol. 9, No. 8, Nov. 15, 1997, pp. 1735-1780.
Howard, J. et al., "Fine-tuned Language Models for Text Classification," arXiv:1801.06146, Jan. 18, 2018, pp. 1-9.
Inan, H. et al., "Tying Word Vectors and Word Classifiers: A Loss Framework for Language Modeling," arXiv:1611.01462, Nov. 4, 2016, pp. 1-10.
Karl, M. et al., "Deep Variational Bayes Filters: Unsupervised Learning of State Space Models from Raw Data," arXiv:1605.06432, May 20, 2016, pp. 1-12.
Krause, B. et al., "Dynamic Evaluation of Neural Sequence Models," arXiv:1709.07432, Sep. 21, 2017, pp. 1-12.
Krishnan, R. G. et al., "Deep Kalman Filters," arXiv:1511.05121, Nov. 25, 2015, pp. 1-17.
Krishnan, R. G. et al., "Structured inference networks for nonlinear state space models," Proceedings of the Thirty-First AAAI Conference on Artificial Intelligence, Feb. 2017, pp. 2101-2109.
Marcus, M. et al., "The Penn Treebank: annotating predicate argument structure," Proceedings of the workshop on Human Language Technology, Mar. 1994, pp. 114-119.
Melis, G. et al., "On the State of the Art of Evaluation in Neural Language Models," arXiv:1707.05589, Nov. 20, 2017, pp. 1-10.
Merity, S. et al., "Pointer Sentinel Mixture Models," ICLR 2017, Apr. 2017, pp. 1-15.
Merity, S. et al., "Regularizing and Optimizing LSTM Language Models," ICLR 2018, Apr.-May 2018, pp. 1-13.
Mikolov, T. et al., "Recurrent neural network based language model," Eleventh Annual Conference of the International Speech Communication Association, Sep. 2010, pp. 1045-1048.
Pascanu, R. et al., "On the difficulty of training recurrent neural networks," Proceedings of the 30th International Conference on International Conference on Machine Learning, Jun. 2013, pp. 1310-1318.
PCT International Search Report and Written Opinion, PCT Application No. PCT/CA2019/050801, Sep. 10, 2019, nine pages.
Peters, M. E. et al., "Deep contextualized word representations," arXiv: 1802.05365, Mar. 22, 2018, pp. 1-15.
Radford, A. et al., "Learning to Generate Reviews and Discovering Sentiment," arXiv:1704.01444, Apr. 6, 2017, pp. 1-9.
Srivastava, N. et al., "Unsupervised Learning of Video Representations using LSTMs," Proceedings of the 32nd International Conference on Machine Learning, vol. 37, Jul. 2015, pp. 843-852.
Sundermeyer, M. et al., "LSTM Neural Networks for Language Modeling," Interspeech 2012, Sep. 2012, pp. 1-4.
Takase, S. et al., "Direct Output Connection for a High-Rank Language Model," Proceedings of the 2018 Conference on Empirical Methods in Natural Language Processing, Oct.-Nov. 2018, pp. 4599-4609.
Yang, Z. et al., "Breaking the Softmax Bottleneck: A High-Rank RNN Language Model," ICLR 2018, Apr.-May 2018, pp. 1-18.
Zaremba, W. et al., "Recurrent Neural Network Regularization," arXiv:1409.2329, Feb. 19, 2015, pp. 1-8.
Zolna, K. et al., "Fraternal Dropout," arXiv:1711.00066, Oct. 31, 2017, pp. 1-11.
Zoph, B. et al., "Neural Architecture Search with Reinforcement Learning," arXiv:1611.01578, Nov. 5, 2016, pp. 1-15.
European Patent Office, Extended European Search Report, European Patent Application No. 19895236.8, Mar. 10, 2022, 10 pages.
Shen, X. et al. "Improving Variational Encoder-Decoders in Dialogue Generation." Cornell University Library, arXiv:1802.02032v1, Feb. 6, 2018, pp. 1-9.
Xu, J. et al. "Spherical Latent Spaces for Stable Variational Autoencoders." Proceedings of the 2018 Conference on Empirical Methods in Natural Language Processing, Oct. 12, 2018, pp. 1-11.

* cited by examiner

PTB Dataset

| Model | Parameters | Validation perplexity | Test perplexity |
|---|---|---|---|
| RNN-LDA + KN-5 + cache (Mikolov et al., 2010) | 9M | - | 92.0 |
| LSTM (large) (Zaremba et al., 2014) | 66M | 82.2 | 78.4 |
| Variational LSTM (large) (Gal and Ghahramani, 2016) | 66M | 77.9 | 75.2 |
| Pointer Sentinel-LSTM (Merity et al., 2016) | 21M | 72.4 | 70.9 |
| Tied Variational LSTM + augmented loss (Inan et al., 2016) | 24M | 75.7 | 73.2 |
| Variational RHN (Inan et al., 2016) | 32M | 71.2 | 68.5 |
| Neural Architectural Search (Zoph and Le, 2016) | 54M | - | 64.0 |
| 2-layer LSTM with skip connection (Melis et al., 2017) | 24M | 60.9 | 58.3 |
| AWD-LSTM (Merity et al., 2018) | 24M | 60.0 | 57.3 |
| AWD-LSTM + Fraternal Dropout (Zolna et al., 2017) | 24M | 58.9 | 56.8 |
| LSTM | 6.3M | 119.2 | 113.4 |
| LSTM + LatentShift | 6.3M | 101.4 (-14.9%) | 98.1 (-12.6%) |
| LSTM-tie | 4.5M | 109.0 | 102.9 |
| LSTM-tie + LatentShift | 4.5M | 93.6 (-14.1%) | 90.2 (-12.3%) |
| AWD-LSTM-MOS (Yang et al., 2018) | 22M | 58.08 | 55.97 |
| AWD-LSTM-MOS + LatentShift | 31M | 57.12 (-1.7%) | 55.32 (-1.1%) |
| AWD-LSTM-MOS with fine-tuning (Yang et al., 2018) | 22M | 56.54 | 54.44 |
| AWD-LSTM-MOS + LatentShift with fine-tuning | 31M | 55.9 (-1.1%) | 54.11 (-0.6%) |

FIG. 7A

WT2 Dataset

| Model | Parameters | Validation perplexity | Test perplexity |
|---|---|---|---|
| Tied Variational LSTM + augmented loss (Inan et al., 2016) | 28M | 91.5 | 87.0 |
| 2-layer LSTM with skip connection (Melis et al., 2017) | 24M | 69.1 | 65.9 |
| AWD-LSTM (Merity et al., 2018) | 33M | 68.6 | 65.8 |
| AWD-LSTM + Fraternal Dropout (Zolna et al., 2017) | 34M | 66.8 | 64.1 |
| LSTM | 15.8M | 129.6 | 122.9 |
| LSTM + LatentShift | 15.8M | 114.9 (-11.3%) | 108.7 (-11.6%) |
| LSTM-tie | 9.2M | 114.2 | 108.6 |
| LSTM-tie + LatentShift | 9.2M | 102.3 (-10.4%) | 97.4 (-10.3%) |
| AWD-LSTM-MOS (Yang et al., 2018) | 35M | 66.01 | 63.33 |
| AWD-LSTM-MOS + LatentShift | 44M | 64.29 (-2.6%) | 62.05 (-2.0%) |
| AWD-LSTM-MOS with fine-tuning (Yang et al., 2018) | 35M | 63.88 | 61.45 |
| AWD-LSTM-MOS + LatentShift with fine-tuning | 44M | 62.93 (-1.5%) | 60.56 (-1.4%) |

FIG. 7B

| Dataset | Model | Training | Fine-tuning | Total |
|---------|-------|----------|-------------|-------|
| PTB | MOS | 1000 | 1000 | 2000 |
| PTB | MOS + LatentShift | 420 | 285 | 705 |
| WT2 | MOS | 1000 | 1000 | 2000 |
| WT2 | MOS + LatentShift | 540 | 470 | 1010 |

Table 2: Number of epochs needed to reach convergence for each model on the Penn Treebank and WikiText-2 datasets. For MOS, the training and fine-tuning times correspond to the settings taken from the code released by the original authors.

FIG. 7C

REGULARIZATION OF RECURRENT MACHINE-LEARNED ARCHITECTURES WITH ENCODER, DECODER, AND PRIOR DISTRIBUTION

CROSS-REFERENCE TO RELATED APPLICATIONS

This application claims the benefit of and priority to U.S. Provisional Application No. 62/778,277, filed Dec. 11, 2018, which is hereby incorporated by reference in its entirety.

BACKGROUND

This invention relates generally to recurrent machine-learned models, and more particularly to regularization of recurrent machine-learned models.

Modeling systems often use recurrent machine-learned models, such as recurrent neural networks (RNN) or long short-term memory models (LSTM), to generate sequential predictions. A recurrent machine-learned model is configured to generate a subsequent prediction based on a latent state for the current prediction, sometimes in combination with an initial sequence of actual inputs. The current latent state represents contextual information on the predictions that were generated up to the current prediction, and is generated based on the latent state for the previous prediction and the value of the current prediction. For example, the sequential predictions may be a sequence of words, and a recurrent machine-learned model may generate a prediction for a subsequent word token based on a current latent state that represents contextual information on an initial sequence of actual word tokens and the predicted word tokens that were generated up to the current word token.

Structurally, recurrent machine-learned models include one or more layers of nodes that are associated with a set of trained parameters. The parameters of the recurrent machine-learned model are trained by iteratively applying the recurrent machine-learned model to a sequence of known observations, and updating the parameters to reduce a loss function across the sequence of observations. However, the parameters are often difficult to train as the complexity and size of the model increases, which can lead to overfitting the model to a dataset or loss of contextual information that may be useful for generating predictions. Although regularization approaches have been applied to reduce model complexity, training recurrent machine-learned models to retain important contextual information and to control sensitivity to successive input data remains a challenging problem.

SUMMARY

A modeling system trains a recurrent machine-learned model by determining a latent distribution and a prior distribution on a latent state. The parameters of the model are trained based on a divergence loss that penalizes significant deviations between the latent distribution and the prior distribution. The latent distribution for a current observation is a distribution for the latent state given a value of the current observation and the latent states for one or more previous observations. The prior distribution for a current observation is a distribution for the latent state given the latent states for the one or more previous observations independent of the value of the current observation, and represents a belief about the latent state before any input evidence is taken into account.

By training the recurrent model in this manner, the modeling system penalizes significant changes between latent states for successive inputs. This prevents overfitting of the model and loss of important long-term contextual information that may be useful for generating predictions. The modeling system can encourage simpler latent state distributions with smoother transitions between successive latent states that retain additional contextual information. Moreover, training the recurrent machine-learned model with the divergence loss can also reduce training time and complexity due to simpler latent state distributions, since the subsequent latent state is inclined to follow the prior distribution, and the degree to which it varies between successive inputs can be controlled.

In one embodiment, the architecture of the recurrent machine-learned model is formulated as an autoencoder that includes an encoder network and a decoder network. The encoder network may be arranged as one or more layers of nodes that are associated with a set of parameters. The encoder network receives a current prediction and one or more previous latent states as input and generates a latent distribution for the current latent state by applying the set of parameters to the input. The decoder network may also be arranged as one or more layers of nodes that are associated with a set of parameters. The decoder network receives a one or more values generated from the latent distribution and generate a subsequent prediction by applying the set of parameters to the values.

The modeling system trains the parameters of the recurrent machine-learned model using sequences of known observations as training data. Each sequence may represent a set of ordered observations that are sequentially dependent with respect to space or time. During the training process, the modeling system iteratively applies the recurrent machine-learned model to the sequence of observations, and trains the parameters of the model to reduce a loss function. The loss function may be determined as the combination of the loss for each observation in the sequence. In particular, the loss for a current observation includes both a prediction loss that increases as the predicted likelihood of the subsequent observation decreases, and also the divergence loss that is measures a difference between a latent distribution and a prior distribution for the latent state of the current observation.

BRIEF DESCRIPTION OF THE DRAWINGS

FIGS. 7A through 7C illustrate performance results of example recurrent machine-learned models in comparison to other state-of-the-art models, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
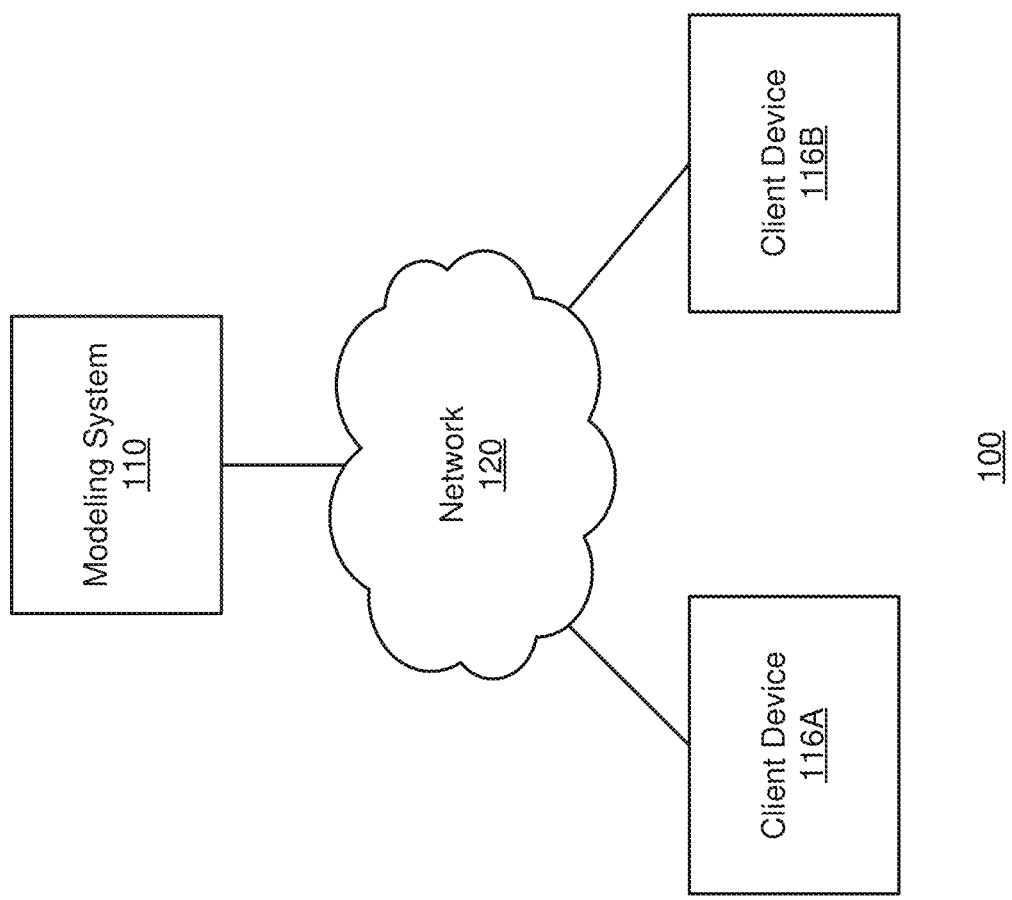
FIG. 1 is a high-level block diagram of a system environment for a modeling system, in accordance with an embodiment.

FIG. 1 is a high-level block diagram of a system environment for a document analysis system 110, in accordance with an embodiment. The system environment 100 shown by FIG. 1 includes one or more client devices 116, a network 120, and a modeling system 110. In alternative configurations, different and/or additional components may be included in the system environment 100.

The modeling system 110 is a system for training various machine-learned models. The modeling system 110 may provide the trained models to users of client devices 116, or may use the trained models to perform inference for various tasks. In one embodiment, the modeling system 110 trains a recurrent machine-learned model that can be used to generate sequential predictions. The sequential predictions are a set of ordered predictions, where a prediction in the sequence may be dependent on values of previous or subsequent predictions with respect to space or time. For example, the sequential predictions may be a sequence of word tokens that are dependent on word tokens included in a previous sentence or paragraph. As another example, the sequential predictions may be a time series of stock prices that are dependent on historical stock prices on previous days.

The recurrent machine-learned model receives a current prediction and generates a subsequent prediction. In particular, the subsequent prediction is generated from a latent state for the current prediction, sometimes in combination with an initial sequence of actual inputs. The current latent state represents contextual information on the predictions that were generated up to the current prediction. For example, when the sequential predictions are a sequence of words, the recurrent machine-learned model may generate a prediction for a subsequent word token based on a current latent state that represents contextual information on an initial sequence of actual word tokens and the predicted word tokens that were generated up to the current word token. The current latent state may be generated based on one or more latent states for one or more previous predictions and the value of the current prediction.

In one embodiment, the architecture of the recurrent machine-learned model is formulated as an autoencoder that includes an encoder network and a decoder network. The encoder network may be arranged as one or more layers of nodes that are associated with a set of trained parameters. The parameters for the encoder network may include a set of input parameters and a set of recurrent parameters. The set of input parameters propagate along the layers of nodes, while the set of recurrent parameters propagate along the sequence in time or space. The encoder network receives a current prediction and the encoder network layers for the previous step, and generates a latent distribution for the current latent state. The latent distribution is a distribution for the latent state given the current prediction and the latent states for one or more previous predictions. The decoder network may also be arranged as one or more layers of nodes that are associated with a set of trained parameters. The decoder network receives one or more values generated from the latent distribution and generate a subsequent prediction by applying the set of parameters to the values.

Figure 2:
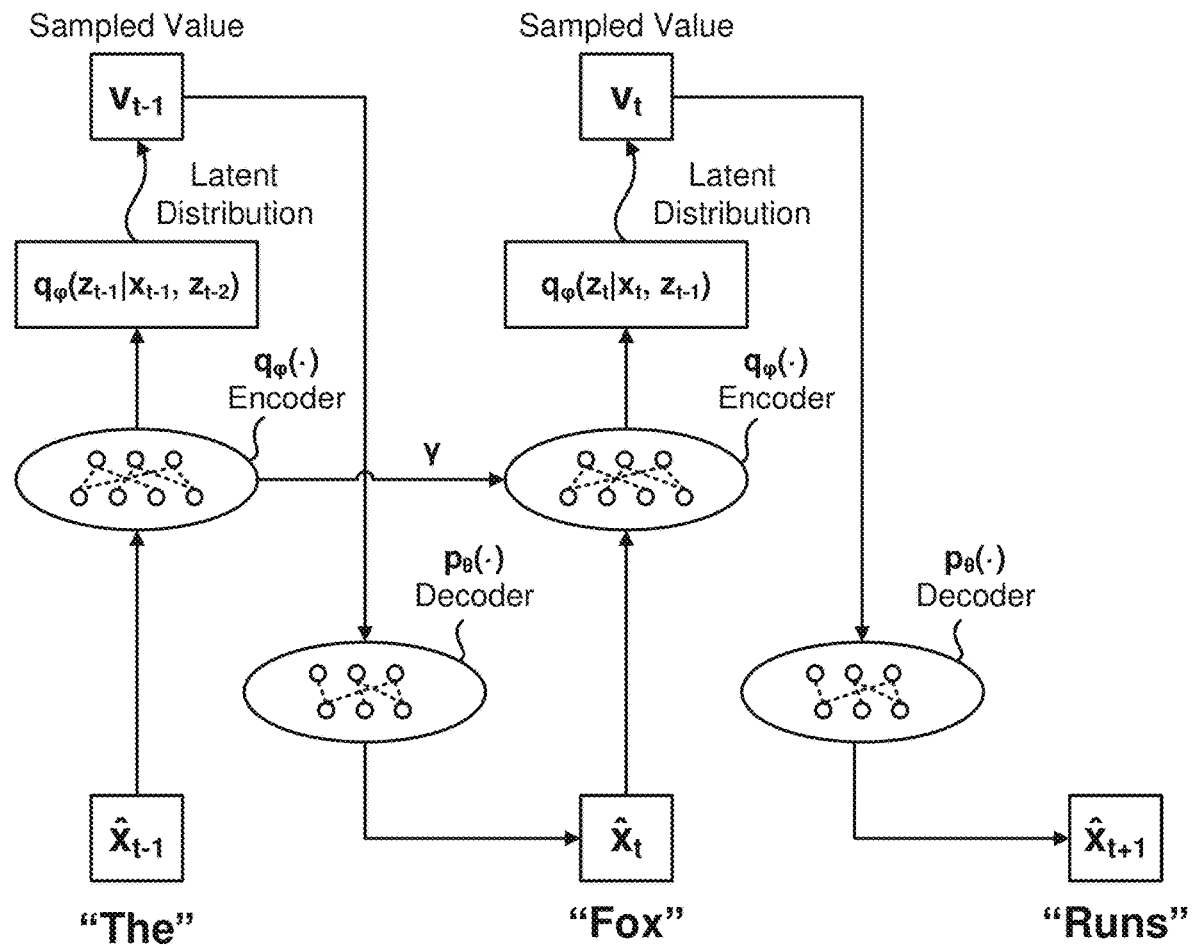
FIG. 2 illustrates an example inference process for a recurrent machine-learned model, in accordance with an embodiment.

FIG. 2 illustrates an example inference process for a recurrent machine-learned model, in accordance with an embodiment. As shown in FIG. 2, the recurrent machine-learned model includes an encoder network $q_\varphi(\cdot)$ associated with a set of trained input parameters $\varphi$ and a set of trained recursive parameters $\gamma$. The recurrent machine-learned model also includes a decoder network $p_\theta(\cdot)$ associated with a set of trained parameters $\theta$. The example shown in FIG. 2 are predictions of word tokens, and a previous prediction $\hat{x}_{t-1}$ of the token "The" and a current prediction $\hat{x}_t$ of the token "Fox" is generated.

During inference at the current iteration t, the set of input parameters $\varphi$ are applied to the current prediction $\hat{x}_t$ along the layers of the encoder network, and the set of recursive parameters $\gamma$ are applied to encoder network layers of the previous step t−1 to generate the latent distribution $q_\varphi(z_t|\hat{x}_t, z_{t-1})$ for the current latent state $z_t$. Thus, the latent state $z_t$ may contain contextual information on the predictions that was generated up to the current prediction it. In one instance, the latent distribution $q_\varphi(z_t|\hat{x}_t, z_{t-1})$ is determined from one or more statistical parameters output by the encoder network. One or more values $v_t$ are generated from the latent distribution $q_\varphi(z_t|\hat{x}_t, z_{t-1})$, and the decoder network $p_\theta(\cdot)$ is applied to the value $v_t$ to generate a subsequent prediction $\hat{x}_{t+1}$. In the example shown in FIG. 2, the subsequent prediction $\hat{x}_{t+1}$ is the word token "Runs" that takes into account the previous predictions of "The" and "Fox," as well as many other words coming before or after the current prediction. In one instance, the value $v_t$ is the mean of the latent distribution $q_\varphi(z_t|\hat{x}_t, z_{t-1})$, or is determined based on one or more samples from the latent distribution $q_\varphi(z_t|\hat{x}_t, z_{t-1})$. However, the value can be other statistical parameters, such as the median of the distribution. This process is repeated until all the predictions are made for the sequence.

Returning to FIG. 1, the parameters of the recurrent model may be trained using sequences of known observations as training data. Each sequence may represent a set of ordered observations that are sequentially dependent with respect to space or time that the recurrent machine-learned model can use to learn sequential dependencies. In one instance, the modeling system 110 may have access to different types of training data depending on the task the recurrent machine-learned model is trained for. For example, the modeling system 110 may have access to training data such as documents and paragraphs that contain sequences of words when the sequential predictions are word tokens. As another example, the modeling system 110 may have access to training data such as historical stock prices when the sequential predictions are future stock prices.

The modeling system 110 may train the parameters of the recurrent model by iterating between a forward pass step and a backpropagation step to reduce a loss function. During the forward pass step, the modeling system 110 generates an estimated latent distribution for a current observation by applying estimated parameters of the encoder network to the current observation and encoder network layers for the previous step. The modeling system 110 generates a predicted likelihood of the subsequent observation by applying estimated parameters of the decoder network to a value generated from the latent distribution. This process is repeated for subsequent observations. During the backpropagation step, the modeling system 110 determines a loss function as a combination of the loss for each observation in the sequence. The loss for a current observation may include a prediction loss that increases as the predicted likelihood of the subsequent observation decreases. The modeling system 110 updates parameters of the recurrent machine-learned model by backpropagating one or more error terms from the loss function.

However, parameters of recurrent machine-learned models are often difficult to train especially as the complexity and size of the recurrent machine-learned model increases. In particular, recurrent machine-learned models are prone to overfitting and can result in the loss of long-term contextual information that may be useful for generating future predictions. Regularization approaches can be used to restrain the magnitude of the parameters, such that model complexity is reduced. Nevertheless, training recurrent machine-learned models remains a challenging problem due to difficulty in applying an effective regularization method.

In one embodiment, the modeling system 110 trains the recurrent machine-learned model by determining both a latent distribution and a prior distribution for a latent state. In addition to the prediction loss, the parameters of the model are trained based on a divergence loss that penalizes significant deviations between the latent distribution and the prior distribution. The prior distribution for a current observation is a distribution for the latent state given the latent states for the one or more previous observations independent of the value of the current observation. Different from the latent distribution, the prior distribution represents a belief about the latent state before an input observation is considered.

During the training process, the modeling system 110 iteratively applies the recurrent machine-learned model to the sequence of observations, and trains the parameters of the model to reduce a loss function. The loss function may be determined as the combination of the loss for each observation in the sequence. In one embodiment, the loss for a current observation includes both a prediction loss that increases as the predicted likelihood of the subsequent observation decreases, and also the divergence loss that measures a difference between a latent distribution and a prior distribution for the latent state of the current observation. A more detailed description of the training process is described below in conjunction with FIGS. 4 and 5.

By training the recurrent model in this manner, the modeling system 110 penalizes significant changes between latent states for successive inputs. This prevents overfitting of the model and loss of important long-term contextual information that may be useful for generating predictions. The modeling system 110 can encourage simpler latent state distributions with smoother transitions between successive latent states, and that retain additional contextual information. Moreover, training the recurrent machine-learned model with the divergence loss can also reduce training time and complexity due to simpler latent state distributions, since the subsequent latent state is inclined to follow the prior distribution and facilitates sampling from the prior distribution, and the degree to which it varies between successive inputs can be controlled.

The users of client devices 116 are various entities that provide requests to the modeling system 130 to train one or more recurrent machine-learned models based on various tasks of interest. The users may also provide the modeling system 130 with training data for the models that are tailored to the tasks of interest. The client devices 116 receive the trained models, and use the models to perform sequential predictions. For example, the client devices 116 may be associated with natural language processing entities that are interested in generating sequential word token predictions for language synthesis. As another example, the client devices 116 may be associated with financial entities that are interested in generating sequential predictions for future investment prices. As yet another example, the client devices 116 may be associated with hospitals that are interested in generating sequential predictions to estimate future hospital visits of a patient given the previous visitation history of the patient.

Modeling System

Figure 3:
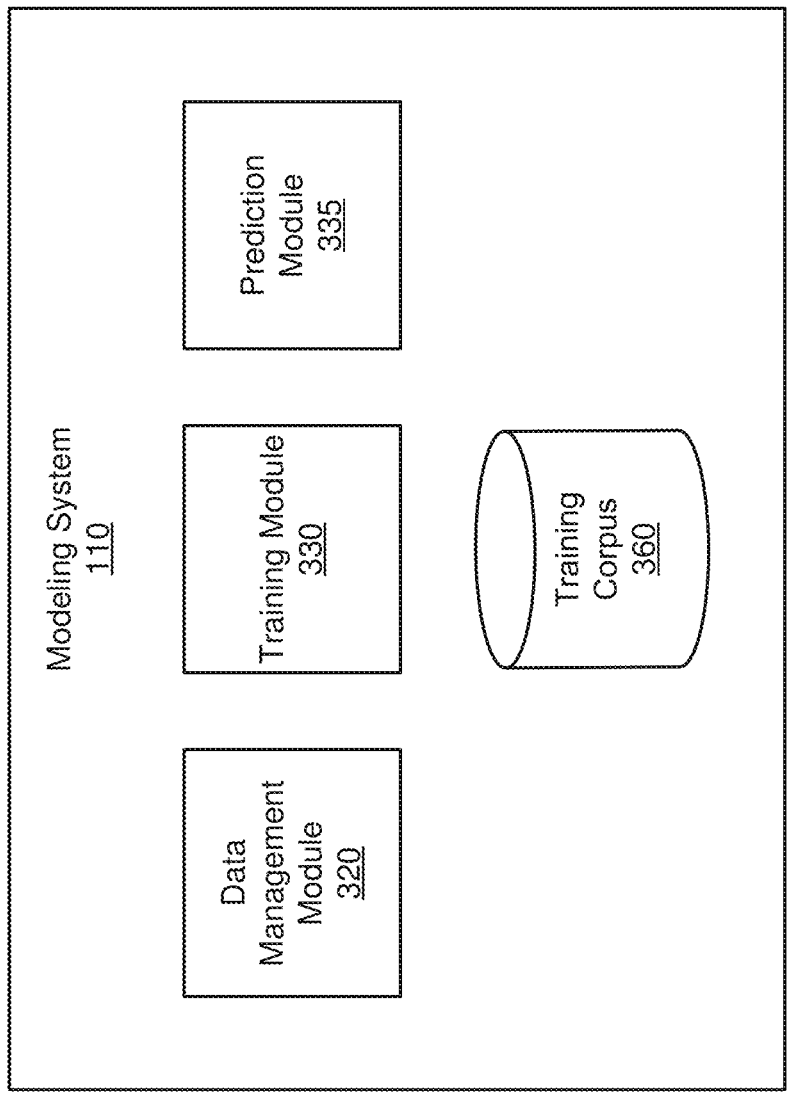
FIG. 3 is a block diagram of an architecture of a modeling system, in accordance with an embodiment.

FIG. 3 is a block diagram of an architecture of the modeling system 110, in accordance with an embodiment. The modeling system 110 shown by FIG. 3 includes a data management module 320, a training module 330, and a prediction module 335. The modeling system 110 also includes a training corpus 360. In alternative configurations, different and/or additional components may be included in the modeling system 110.

The data management module 320 manages the training corpus 360 of training data that are used to train the parameters of the recurrent machine-learned model. The training data includes sequences of known observations that are sequentially dependent, with respect to space or time. Among other things, the data management module 320 may also encode the training data into numerical form for processing by the recurrent machine-learned model. For example, for a sequence of word tokens $x_1, x_2, \ldots, x_T$, the data management module 320 may encode each word token as a one-hot encoded vector that represents a vocabulary of words obtained from, for example, documents in the training corpus 360, in which the only element corresponding to the word has a non-zero value. For example, when a vocabulary of words for the training corpus 360 is the set {"forward," "backward," "left," "right"}, the word "right" may be encoded as the vector x=[0 0 0 1], in which the fourth element corresponding to the word has the only non-zero value.

The training module 330 trains the parameters of the recurrent machine-learned model by iteratively reducing a loss function. The loss for each observation in the training sequence includes both a prediction loss and a divergence loss that penalizes significant deviations between the latent distribution and the prior distribution for an observation. In one embodiment, during the training process, the recurrent machine-learned model additionally includes a transition network for generating the prior distribution of the latent state. The transition network may be arranged as one or more layers of nodes that are associated with a set of parameters. The transition network receives one or more values generated from the latent distributions of one or more previous observations and generates the prior distribution for the current observation by applying the set of parameters to the one or more values generated from the latent distributions of the one or more previous observations.

Figure 4:
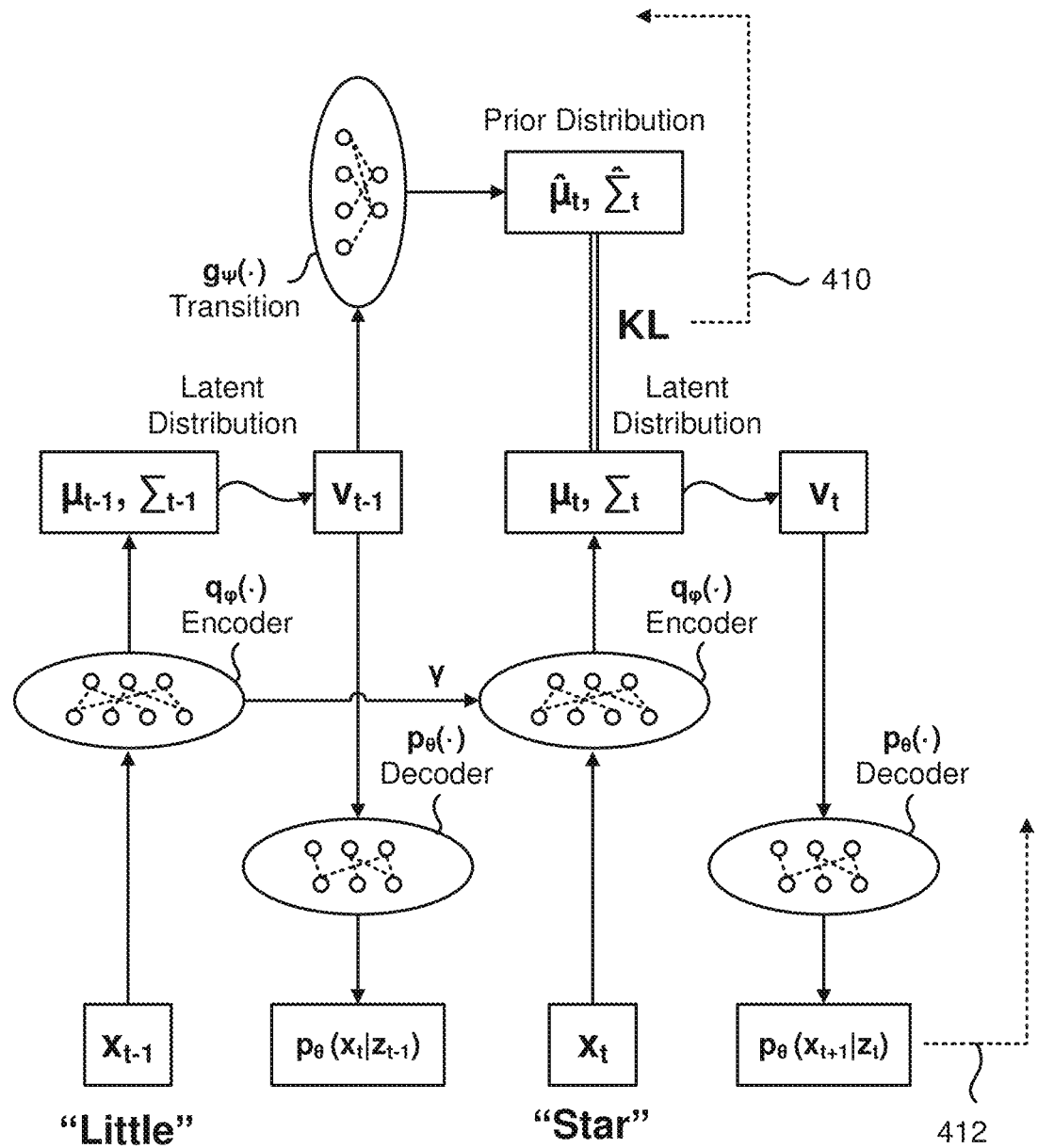
FIG. 4 illustrates an example training process for a recurrent machine-learned model, in accordance with an embodiment.

FIG. 4 illustrates an example training process for a recurrent machine-learned model, in accordance with an embodiment. The training module 330 iterates between a forward pass step and a backpropagation step to train the parameters of the recurrent machine-learned model. As shown in FIG. 4, the recurrent machine-learned model additionally includes a transition network $g_\psi(\cdot)$ associated with a set of trained parameters $\psi$, in addition to the encoder network $q_\varphi(\cdot)$ and the decoder network $p_\theta(\cdot)$ Among other word tokens in the sequence, the training sequence includes word token $x_{t-1}$ "Little," and word token $x_t$ "Star."

During the forward pass step, the training module 330 generates an estimated latent distribution and a corresponding prior distribution for each observation in the sequence.

The training module 330 also generates a predicted likelihood of a subsequent observation for each observation in the sequence. Specifically, for a current observation $x_t$, the training module 330 generates an estimated latent distribution $q_\varphi(z_t|x_t, z_{t-1})$ by applying the set of input parameters $\varphi$ to the current observation $x_t$ along the layers of the encoder network $q_\varphi(\bullet)$, and the set of recursive parameters $\gamma$ to the encoder network layers of the previous step t−1. The training module 330 also generates an estimated prior distribution $g_\psi(z_t|z_{t-1})$ by applying the transition network $g_\psi(\bullet)$ to one or more values $v_{t-1}$ generated from the latent distribution of the previous observation. The training module 330 also generates one or more values $v_t$ from the current latent distribution.

The training module 330 generates a predicted likelihood for the subsequent observation $p_\theta(x_{t+1}|z_t)$ by applying the decoder network $p_\theta(\bullet)$ to the values $v_t$. This process is repeated for remaining subsequent observations in the sequence. In one instance, the encoder network is configured to receive one-hot encoded token vectors as input. In such an instance, the decoder network may be configured to generate an output vector, in which each element in the output vector corresponds to a predicted likelihood of observing the corresponding token for the element.

After the forward pass step, the training module 330 determines a loss for each observation in the sequence. For a current observation $x_t$, the loss includes a prediction loss that increases as the predicted likelihood for the subsequent observation $p_\theta(x_{t+1}|z_t)$ decreases, and a divergence loss that penalizes significant deviations between the latent distribution $q_\varphi(z_t|x_t, z_{t-1})$ and the prior distribution $g_\psi(z_t|z_{t-1})$ for the observation $x_t$. In one embodiment, the prediction loss for the current observation $x_t$ is given by:

$$L_p = E_{z_t \sim q_\phi(z_t|x_t,z_{t-1})}(\log p_\theta(x_{t+1}|z_t)) \quad (1)$$

which takes an expectation of the likelihood of predicting the subsequent observation $x_{t+1}$ over the current latent distribution $q_\varphi(z_t|x_t, z_{t-1})$. Thus, the prediction loss of equation (1) may be determined by taking the expectation of predicted likelihoods for the subsequent observation $p_\theta(x_{t+1}|z_t)$ that were generated by applying the decoder network $p_\theta(\bullet)$ to the values $v_t$ in the forward pass step. In one embodiment, the divergence loss for the current observation $x_t$ is given by:

$$L_d = KL(q_\phi(z_t|x_t z_{t-1}) \| g_\psi(z_t|Z_{t-1})) \quad (2)$$

where KL($\bullet$) denotes the Kullback-Leibler divergence of the latent distribution and the prior distribution for the current observation $x_t$. Thus, the divergence loss of equation (2) measures a difference between the latent distribution and the prior distribution for the current observation $x_t$.

The training module 330 determines the loss function as the combination of the loss for each observation in the sequence. In one instance, the loss function for a sequence of observations is determined by:

$$L_T = -\lambda \cdot \sum_t E_{z_t \sim q_\phi(z_t|x_t,z_{t-1})}(\log p_\theta(x_{t+1}|z_t)) + \gamma \cdot \sum_t KL(q_\phi(z_t|x_t, z_{t-1}) \| g_\psi(z_t|z_{t-1})) \quad (3)$$

where t denotes the index of observations in the sequence, and $\lambda$, $\gamma$ are hyperparameters that control the contribution for each term. During the backpropagation step, the training module 330 updates the parameters of the encoder network $q_\varphi(\bullet)$, decoder network $p_\theta(\bullet)$, and the transition network $g_\psi(\bullet)$ by backpropagating one or more error terms to reduce the loss function. Thus, by increasing the ratio between $\lambda$ and $\gamma$, the parameters of the recurrent machine-learned model are trained to reduce the prediction loss relative to the divergence loss, and by decreasing the ratio between $\lambda$ and $\gamma$, the parameters are trained to reduce the divergence loss relative to the prediction loss.

In this manner, the parameters of the encoder network $q_\varphi(\bullet)$ and the decoder network $p_\theta(\bullet)$ are trained such that the latent distribution for the current prediction that is used to generate the subsequent prediction does not significantly deviate from the previous latent state based on the value of the current prediction alone. This allows simpler representations of latent states, and a more efficient training process for recurrent machine-learned models.

In one instance, the latent distribution $q_\varphi(z_t|x_t, z_{t-1})$ and the prior distribution $g_\psi(z_t|z_{t-1})$ for the current observation $x_t$ are defined by a statistical parameters of a probability distribution. In the example shown in FIG. 4, the estimated latent distribution $q_\varphi(z_t|x_t, z_{t-1})$ may be a Gaussian distribution defined by the mean pt and covariance matrix $\Sigma_t$. The estimated prior distribution $g_\psi(z_t|z_{t-1})$ may be a Gaussian distribution defined by the mean $\hat{\mu}_t$ and covariance matrix $\tau_t$. In such an instance, the last layer of the encoder network $q_\varphi(\bullet)$ may be configured to output the statistical parameters that define the latent distribution $q_\varphi(z_t|x_t, z_{t-1})$. The last layer of the transition network $g_\psi(\bullet)$ may also be configured to output the statistical parameters that define the prior distribution $g_\psi(z_t|z_{t-1})$. Alternatively, the training module 330 may determine the statistical parameters of the prior distribution by applying the estimated set of parameters of the transition network $g_\psi(\bullet)$ to the values $v_{t-1}$ generated from the previous latent distribution $q_\varphi(z_{t-1}|x_{t-1}, z_{t-2})$, and averaging the output across the values.

When the prior distribution is modeled as a Gaussian probability distribution, the statistical parameters of the prior distribution for a current observation $x_t$ may be determined by:

$$\hat{\mu}_t = W_\mu \cdot v_{t-1} + b_\mu$$

$$\hat{\Sigma}_t = \text{softplus}(W_\Sigma \cdot v_{t-1} + b_\Sigma) \quad (4)$$

where $W_\mu$, $b_\mu$, $W_\Sigma$, and $b_\Sigma$ are the set of parameters of the transition network $g_\psi(\bullet)$. In another instance, the statistical parameters of the prior distribution may be determined by:

$$a_t = W_2 \circ \text{relu}(W_1 \cdot v_{t-1} + b_1) + b_2$$

$$\hat{\mu}_t = W_\mu \cdot v_{t-1} + b_\mu$$

$$\hat{\Sigma}_t = \text{softplus}(a_t) \quad (5)$$

where $W_1$, $b_1$, $W_2$, $b_2$, $W_\mu$, $b_\mu$, $W_\Sigma$ and $b_\Sigma$ are the set of parameters of the transition network $g_\psi(\bullet)$ In another instance, the statistical parameters of the prior distribution may be determined by:

$$k_t = \text{sigmoid}(W_1 \cdot v_{t-1} + b_1)$$

$$a_t = W_2 \circ v_{t-1} + b_2$$

$$\hat{\mu}_t = (1-k_t) \odot (W_\mu \cdot v_{t-1} + b_\mu) + k_t \odot a_t$$

$$\hat{\Sigma}_t = \text{softplus}(W_\Sigma \circ \text{relu}(a_t) + b_\Sigma) \quad (6)$$

where $W_1$, $b_1$, $W_2$, $b_2$, $W_\mu$, $b_\mu$, $W_\Sigma$, and $b_\Sigma$ are the set of parameters of the transition network $g_\psi(\bullet)$ In another instance, the statistical parameters of the prior distribution may be determined by:

$$k_t = \text{sigmoid}(W_2 \circ \text{relu}(W_1 \cdot v_{t-1} + b_1) + b_2)$$

$$a_t = W_4 \circ \text{relu}(W_3 \cdot v_{t-1} + b_3) + b_4$$

$$\hat{\mu}_t = (1-k_t) \odot (W_\mu \cdot v_{t-1} + b_\mu) + k_t \odot \alpha_t$$

$$\hat{\Sigma}_t = \text{softplus}(W_\Sigma \circ \text{relu}(\alpha_t) + b_\Sigma) \quad (7)$$

where $W_1$, $b_1$, $W_2$, $b_2$, $W_3$, $b_3$, $W_4$, $b_4$, $W\mu$, $b_\mu$, $W_\Sigma$, and $b_\Sigma$ are the set of parameters of the transition network $g_\psi(\bullet)$. The symbol $\circ$ denotes matrix multiplication and $\odot$ denotes element-wise multiplication. The softplus function is defined as $\text{softplus}(x) = \ln(1+e^x)$. In one instance, the complexity of the transition network $g_\psi(\bullet)$ increases from equations (4) to (7), and the training module 330 may select the appropriate architecture of the transition network $g_\psi(\bullet)$ for training depending on the complexity of the data.

In one embodiment, the training module 330 trains a recurrent machine-learned model with an encoder network including an embedding layer and a series of hidden layers placed after the embedding layer. The embedding layer is generated by applying a set of input parameters for the embedding layer to an input vector. Each hidden layer is generated by applying a corresponding subset of input parameters to the previous output. In one instance, the set of recursive parameters for the recurrent machine-learned model are configured such that a particular hidden layer for a current step t is generated by applying a subset of recursive parameters to the values of the particular hidden layer at a previous step t−1.

Figure 5:
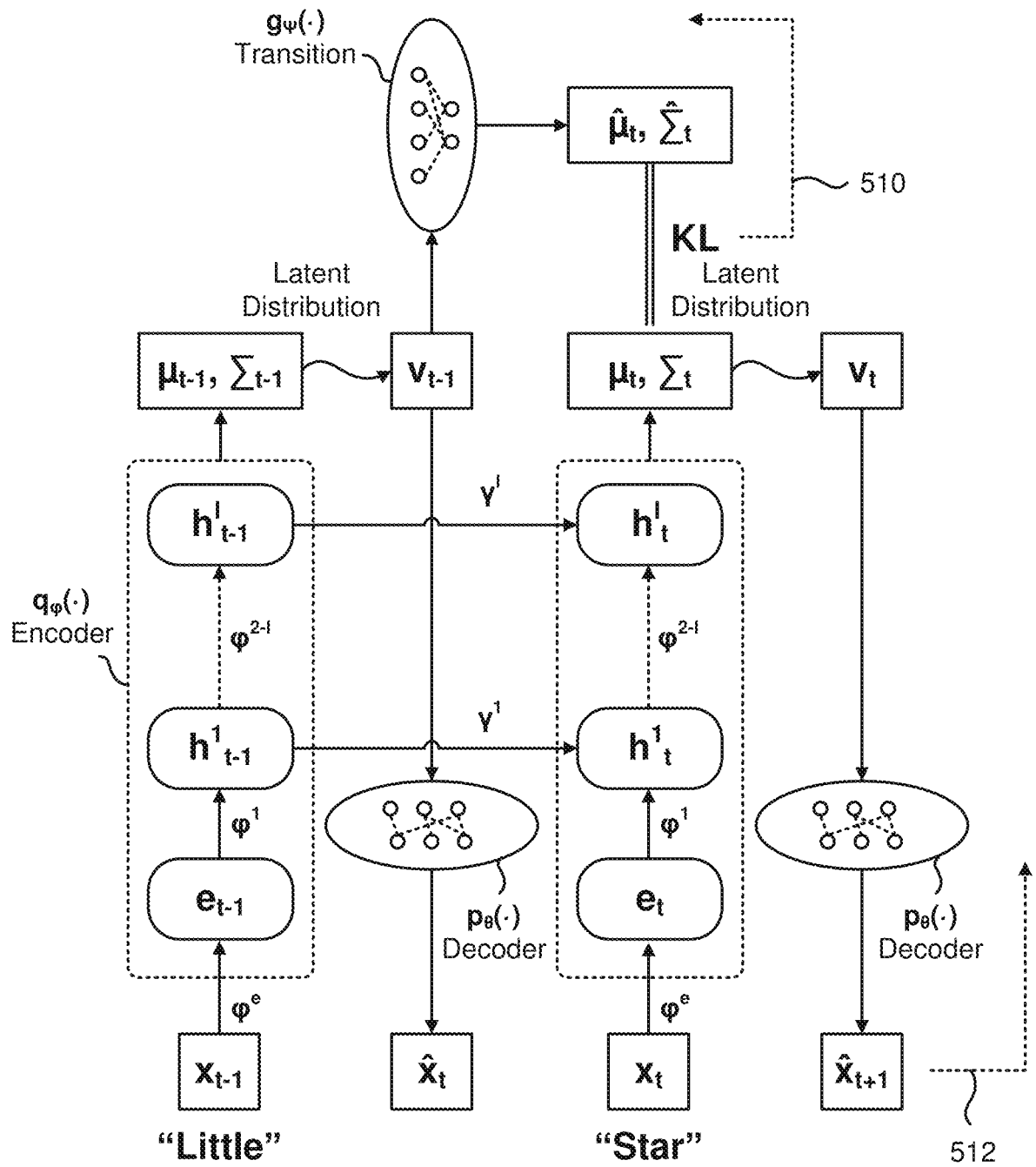
FIG. 5 illustrates an example architecture for a recurrent machine-learned model including an embedding layer, in accordance with an embodiment.

FIG. 5 illustrates an example architecture for a recurrent machine-learned model including an embedding layer, in accordance with an embodiment. As shown in FIG. 5, the architecture of the encoder network $q_\varphi(\bullet)$ includes an embedding layer e as the first layer and multiple hidden layers $h^1, h^2, \ldots, h^l$ placed after the embedding layer e. In the example shown in FIG. 5, the embedding layer et for step t is generated by applying the subset of input parameters $\varphi^e$ to the input vector for a word token. During the training process, this may be the input vector for the current observation $x_t$, and during the inference process, this may be the input vector for the current prediction $\hat{x}_t$. Each subsequent hidden layer $h_t$ is generated by applying a subset of input parameters $\varphi$ to the previous output, and a subset of recursive parameters $\gamma$ to values of the corresponding hidden layer at the previous step t−1.

After the training process has completed, the embedding vector e for a word token is configured to represent the embedding of the word in a latent space, such that an embedding for a word token are closer in distance to embeddings for other word tokens that share similar meanings or appear in similar contexts, and are farther in distance to embeddings for other word tokens that are different in meaning or appear in different contexts, as determined by word embedding models, such as word2vec. In this manner, the remaining layers of the encoder network can process word tokens with better contextual information, and can help improve prediction accuracy of the model.

Returning to FIG. 3, the prediction module 335 receives requests to perform one or more tasks to generate sequential predictions using the trained recurrent machine-learned model. Similarly to the inference process of FIG. 2, the prediction module 335 may repeatedly apply the set of parameters of the encoder network and the decoder network to generate one or more sequential predictions. In one example, the sequential predictions are an ordered set of words. In such an example, a subsequent word prediction is generated based on the latent state of the current prediction that represents the context of previous word predictions. In another example, the sequential predictions are predictions of visitation patterns, such as visitation patterns of a patient to a hospital. In such an example, a subsequent visitation prediction is generated based on the latent state of the current prediction that represents the context of previous visitation patterns of the patient.

In one instance, when the sequential predictions are word or phrase tokens and the decoder network is configured to generate an output vector of probabilities, the prediction module 335 may determine a current prediction by selecting a token in the output vector that is associated with the highest likelihood. In another instance, the prediction module 335 may select a token in the output vector that satisfies an alternative criteria based on the likelihoods generated by the recurrent machine-learned model.

Figure 6:
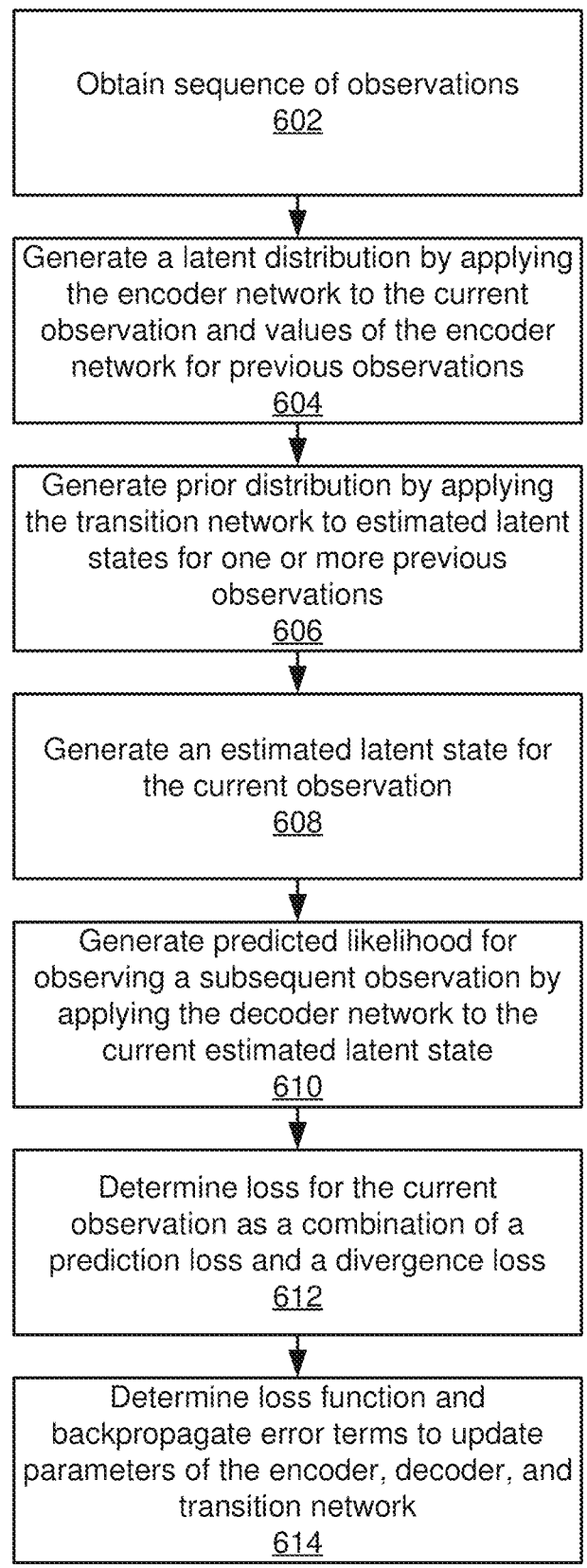
FIG. 6 illustrates a method for training a recurrent machine-learned model, in accordance with an embodiment.

FIG. 6 illustrates a method for training a recurrent machine-learned model, in accordance with an embodiment. The modeling system 110 obtains 602 a sequence of known observations. The sequence of known observations may be a set of ordered data that the recurrent machine-learned model can use to learn sequential dependencies with respect to space or time. For each observation in the sequence, the modeling system 110 generates 604 a current latent distribution for the current observation by applying the encoder network to the current observation and values of the encoder network for one or more previous observations. The latent distribution for the current observation represents a distribution for the latent state of the current observation given a value of the current observation and latent states for the one or more previous observations. The modeling system 110 also generates 606 a prior distribution by applying the transition network to estimated latent states for the one or more previous observations generated from previous latent distributions for the previous observations. The prior distribution for the current observation represents a distribution for the latent state of the current observation given the latent states for the one or more previous observations independent of the value of the current observation.

The modeling system 110 generates 608 an estimated latent state for the current observation from the current latent distribution. The modeling system 110 generates 610 a predicted likelihood for observing a subsequent observation by applying the decoder network to the estimated latent state for the current observation. The modeling system 110 determines 612 a loss for the current observation as a combination of a prediction loss and a divergence loss. The prediction loss increases as the predicted likelihood of the subsequent observation decreases. The divergence loss measures a difference between a latent distribution and a prior distribution for the latent state of the current observation. The modeling system 110 determines 614 a loss function as a combination of the losses for each observation in the sequence, and backpropagates one or more error terms to update the parameters of the encoder network, the decoder network, and the transition network.

Performance Results for Example Recurrent Models

FIGS. 7A through 7C illustrate performance results of example recurrent machine-learned models presented herein in comparison to other state-of-the-art models. Specifically, the results shown in FIGS. 7A through 7C train recurrent machine-learned models as discussed herein and other models respectively on training datasets that are subsets of the "Penn Treebank" (PTB) dataset and "WikiText-2" (WT2) dataset. The PTB dataset contained 10,000 vocabularies, with 929,590 tokens in the training dataset, 73,761 in the validation dataset, and 82,431 tokens in the test dataset. The WT2 dataset contained 33,278 vocabularies, with 2,088,628 tokens in the training dataset, 217,646 tokens in the validation dataset, and 245,569 tokens in the test dataset.

The performance of each model is determined by applying the models on test data that is a subset of the same dataset that does not overlap with the training data, and comparing the proportion of word tokens in the test data in which the predicted word token for the iteration generated by the model is equal to the known word token in the test data. One metric that measures the performance of the models in a language processing context is the perplexity. The perplexity indicates how well the model predicts samples in the dataset. A low perplexity may indicate that the model is good at generating accurate predictions.

FIG. 7A illustrates the perplexities of the PTB dataset. FIG. 7B illustrates the perplexities of the WT2 dataset. Among other types of models, the "LSTM" model is a base two-layer LSTM architecture with an embedding layer of size 200, a hidden layer of size 400, and an output layer of size 200. The "LSTM-tie" model is similar in architecture as the LSTM model, except that the parameters of the embedding layer are tied to that of the output layer. The "AWD-LSTM-MOS" model is a state-of-the-art mixture-of-softmaxes model in language processing. The "LSTM+LatentShift" model is the LSTM model modified with the regularization process using the transition network described herein. The output layer of the LSTM+LatentShift model is doubled to incorporate the statistical parameters output by the encoder network. Similarly, the "LSTM-tie+LatentShift" model is the LSTM-tie model modified with the regularization process using the transition network, and the "AWD-LSTM-MOS+LatentShift" model is the AWD-LSTM-MOS model modified with the regularization process using the transition network, in which the size of the latent state is matched with the size of the output layer in the MOS model.

As indicated in FIGS. 7A-7B, recurrent machine-learned models trained with the regularization process described herein consistently outperform other state-of-the-art recurrent models with relative gains of more than 10%. In particular, while the AWD-LSTM-MOS model is a model with many hyperparameters, the regularization process is able to improve this model without changing default hyperparameter values.

FIG. 7C illustrates the number of epochs needed to reach convergence for training the MOS model and the MOS+LatentShift model on both the PTB and WT2 datasets. As indicated in FIG. 7C, the MOS+LatentShift model converges nearly 3 times faster for the PTB dataset and nearly 2 times faster for the WT2 dataset. This is a very significant speedup as training the MOS model can be computationally demanding and can take several days even on multiple GPUs. The performance results indicate that applying the regularization process described herein can reduce computational resources and complexity for training recurrent machine-learned models, while improving prediction accuracy.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of training a recurrent machine-learned model having an encoder network, a decoder network, and a transition network, the method comprising:
   obtaining a sequence of observations;
   for each observation in the sequence, repeatedly performing the steps of:
      generating a current latent distribution for a current observation by applying the encoder network to the current observation and values of the encoder network for one or more previous observations, the current latent distribution representing a distribution for a latent state of the current observation given a value of the current observation and a latent state for the one or more previous observations;

generating a prior distribution by inputting a value generated from a previous latent distribution for at least a previous observation directly preceding the current observation in the sequence directly to an input layer of a transition network without inputting the observations and the latent state of the current observation into the transition network, the previous latent distribution generated by applying the encoder network to the previous observation, the prior distribution representing a distribution for the latent state of the current observation given the latent state for the one or more previous observations independent of the value of the current observation;

generating an estimated latent state for the current observation from the current latent distribution;

generating a predicted likelihood for observing a subsequent observation that comes after the current observation in the sequence given the latent state for the current observation by applying the decoder network directly to the estimated latent state for the current observation without inputting the observations into the decoder network; and determining a loss for the current observation including a combination of a prediction loss and a divergence loss, the prediction loss indicating a difference between the predicted likelihood and the subsequent observation, and the divergence loss indicating a measure of difference between the current latent distribution and the prior distribution; and determining a loss function of the sequence of observations as a combination of the losses for each observation in the sequence; and backpropagating one or more error terms from the loss function to update parameters of the encoder network, the decoder network, and the transition network.

2. The method of claim 1, wherein the estimated latent state for the current observation is generated by sampling one or more values from the latent distribution for the current observation.

3. The method of claim 2, wherein generating the predicted likelihood comprises generating one or more predicted likelihoods of observing the subsequent observation by applying the decoder network to the one or more sampled values from the latent distribution for the current observation.

4. The method of claim 3, wherein the prediction loss is an expected value of the one or more predicted likelihoods.

5. The method of claim 1, wherein the divergence loss is a Kullback-Leibler divergence between the prior distribution and the current latent distribution.

6. The method of claim 1, wherein the current latent distribution is defined by a set of statistical parameters of a probability distribution, and wherein the encoder network is configured to output the set of statistical parameters.

7. The method of claim 1, wherein the prior distribution is defined by a set of statistical parameters of a probability distribution, wherein the value is sampled from the previous latent distribution, and wherein generating the prior distribution comprises:

applying the transition network to the value sampled from the previous latent distribution to generate one or more corresponding output values; and estimating the set of statistical parameters for the prior distribution from the one or more output values.

8. A non-transitory computer-readable medium containing instructions for execution on a processor, the instructions comprising:

obtaining a sequence of observations;

for each observation in the sequence, repeatedly performing the steps of:

generating a current latent distribution for a current observation by applying an encoder network to the current observation and values of the encoder network for one or more previous observations, the current latent distribution representing a distribution for a latent state of the current observation given a value of the current observation and a latent state for the one or more previous observations;

generating a prior distribution by inputting a value generated from a previous latent distribution for at least a previous observation directly preceding the current observation in the sequence directly to an input layer of a transition network without inputting the observations and the latent state of the current observation into the transition network, the previous latent distribution generated by applying the encoder network to the previous observation, the prior distribution representing a distribution for the latent state of the current observation given the latent state for the one or more previous observations independent of the value of the current observation;

generating an estimated latent state for the current observation from the current latent distribution;

generating a predicted likelihood for observing a subsequent observation that comes after the current observation in the sequence given the latent state for the current observation by applying a decoder network directly to the estimated latent state for the current observation without inputting the observations into the decoder network; and determining a loss for the current observation including a combination of a prediction loss and a divergence loss, the prediction loss indicating a difference between the predicted likelihood and the subsequent observation, and the divergence loss indicating a measure of difference between the current latent distribution and the prior distribution; and determining a loss function of the sequence of observations as a combination of the losses for each observation in the sequence; and backpropagating one or more error terms from the loss function to update parameters of the encoder network, the decoder network, and the transition network.

9. The computer-readable medium of claim 8, wherein the estimated latent state for the current observation is generated by sampling one or more values from the latent distribution for the current observation.

10. The computer-readable medium of claim 9, wherein generating the predicted likelihood comprises generating one or more predicted likelihoods of observing the subsequent observation by applying the decoder network to the one or more sampled values from the latent distribution for the current observation, and wherein the prediction loss is an expected value of the one or more predicted likelihoods.

11. The computer-readable medium of claim 8, wherein the divergence loss is a Kullback-Leibler divergence between the prior distribution and the current latent distribution.

12. The computer-readable medium of claim 8, wherein the current latent distribution is defined by a set of statistical parameters of a probability distribution, and wherein the encoder network is configured to output the set of statistical parameters.

13. The computer-readable medium of claim 8, wherein the prior distribution is defined by a set of statistical parameters of a probability distribution, wherein the value is sampled from the previous latent distribution, and wherein generating the prior distribution comprises:
applying the transition network to the value sampled from the previous latent distribution to generate one or more corresponding output values; and
estimating the set of statistical parameters for the prior distribution from the one or more output values.

14. A non-transitory computer readable storage medium storing a recurrent machine-learned model, wherein the recurrent machine-learned model is manufactured by a process comprising:
obtaining a sequence of observations;
for each observation in the sequence, repeatedly performing the steps of:
generating a latent distribution for a current observation by applying an encoder network to the current observation and values of the encoder network for one or more previous observations, the latent distribution representing a distribution for a latent state of the current observation given a value of the current observation and a latent state for the one or more previous observations;
generating a prior distribution by inputting a value generated from a previous latent distribution for at least a previous observation directly preceding the current observation in the sequence directly to an input layer of a transition network without inputting the observations and the latent state of the current observation into the transition network, the previous latent distribution generated by applying the encoder network to the previous observation, the prior distribution representing a distribution for the latent state of the current observation given the latent state for the one or more previous observations independent of the value of the current observation;
generating an estimated latent state for the current observation from the latent distribution for the current observation;
generating a predicted likelihood for observing a subsequent observation that comes after the current observation in the sequence given the latent state for the current observation by applying a decoder network directly to the estimated latent state for the current observation without inputting the observations into the decoder network; and
determining a loss for the current observation including a combination of a prediction loss and a divergence loss, the prediction loss indicating a difference between the predicted likelihood and the subsequent observation, and the divergence loss indicating a measure of difference between the latent distribution and the prior distribution;
determining a loss function of the sequence of observations as a combination of the losses for each observation in the sequence;
backpropagating one or more error terms from the loss function to update parameters of the encoder network, the decoder network, and the transition network; and
storing the parameters of the encoder network and the decoder network on the non-transitory computer readable storage medium.

15. The recurrent machine-learned model of claim 14, wherein the estimated latent state for the current observation is generated by sampling one or more values from the latent distribution for the current observation.

16. The recurrent machine-learned model of claim 15, wherein generating the predicted likelihood comprises generating one or more predicted likelihoods of observing the subsequent observation by applying the decoder network to the one or more sampled values from the latent distribution for the current observation.

17. The recurrent machine-learned model of claim 16, wherein the prediction loss is an expected value of the one or more predicted likelihoods.

18. The recurrent machine-learned model of claim 14, wherein the divergence loss is a Kullback-Leibler divergence between the prior distribution and the current latent distribution.

19. The recurrent machine-learned model of claim 14, wherein the current latent distribution is defined by a set of statistical parameters of a probability distribution, and wherein the encoder network is configured to output the set of statistical parameters.

20. The recurrent machine-learned model of claim 14, wherein the prior distribution is defined by a set of statistical parameters of a probability distribution, wherein the value is sampled from the previous latent distribution, and wherein generating the prior distribution comprises:
applying the transition network to the value sampled from the previous latent distribution to generate one or more corresponding output values; and
estimating the set of statistical parameters for the prior distribution from the one or more output values.

21. The method of claim 1, wherein the transition network is parameterized by a different set of parameters than parameters of the decoder network.

* * * * *